US010809476B2

(12) United States Patent
Murata et al.

(10) Patent No.: US 10,809,476 B2
(45) Date of Patent: *Oct. 20, 2020

(54) OPTICAL FIBER COLORED CORE WIRE, OPTICAL FIBER CABLE, AND METHOD OF MANUFACTURING OPTICAL FIBER COLORED CORE WIRE

(71) Applicant: FUJIKURA LTD., Tokyo (JP)

(72) Inventors: Akira Murata, Sakura (JP); Yoshie Sajima, Sakura (JP); Mizuki Isaji, Sakura (JP); Tomoaki Kaji, Sakura (JP)

(73) Assignee: Fujikura Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/337,858

(22) PCT Filed: Sep. 28, 2017

(86) PCT No.: PCT/JP2017/035146
§ 371 (c)(1),
(2) Date: Mar. 28, 2019

(87) PCT Pub. No.: WO2018/062364
PCT Pub. Date: Apr. 5, 2018

(65) Prior Publication Data
US 2020/0026012 A1    Jan. 23, 2020

(30) Foreign Application Priority Data
Sep. 30, 2016  (JP) .................................. 2016-194549

(51) Int. Cl.
*G02B 6/44*    (2006.01)
*G02B 6/02*    (2006.01)

(52) U.S. Cl.
CPC ............. *G02B 6/443* (2013.01); *G02B 6/447* (2013.01); *G02B 6/4486* (2013.01)

(58) Field of Classification Search
CPC ....... G02B 6/443; G02B 6/447; G02B 6/4486
See application file for complete search history.

(56) References Cited

U.S. PATENT DOCUMENTS 6,004,675 A    12/1999  Akasaka et al.
6,804,442 B1   10/2004  Watanabe et al.
(Continued)

FOREIGN PATENT DOCUMENTS

CN    103827719 A    5/2014
JP    S62-202842 A   9/1987
(Continued)

OTHER PUBLICATIONS

International Telecommunication Union Telecommunication Standardization Sector of ITU (ITU-T), Series G: Transmission Systems and Media, Digital Systems and Networks, G.652, dated Nov. 2016 (28 pages).
(Continued)

*Primary Examiner* — Ryan A Lepisto
(74) *Attorney, Agent, or Firm* — Osha Liang LLP

(57) ABSTRACT

An optical fiber colored core wire includes: a bare optical fiber; a primary layer that comprises a UV curable resin that covers the bare optical fiber; a secondary layer that comprises a UV curable resin that covers the primary layer; and a colored layer disposed outside the secondary layer and that comprises a colored UV curable resin. The primary layer has a Young's modulus that is greater than or equal to 70% of a saturated Young's modulus of the primary layer.

8 Claims, 2 Drawing Sheets

(56) References Cited

U.S. PATENT DOCUMENTS

| | | |
|---|---|---|
| 6,907,175 B2 | 6/2005 | Suzuki et al. |
| 9,097,867 B2 * | 8/2015 | Tachibana ................ G02B 6/44 |
| 2003/0053781 A1 | 3/2003 | Fabian |
| 2005/0226573 A1 | 10/2005 | Okuno et al. |
| 2006/0088263 A1 | 4/2006 | Tanaka et al. |
| 2008/0131062 A1 | 6/2008 | Sendai et al. |
| 2011/0274396 A1 | 11/2011 | Nakajima et al. |
| 2011/0274397 A1 | 11/2011 | Weimann et al. |
| 2013/0266281 A1 | 10/2013 | Tanaka et al. |
| 2013/0302003 A1 | 11/2013 | Bookbinder et al. |
| 2014/0226941 A1 | 8/2014 | Tanaka et al. |
| 2014/0301704 A1 * | 10/2014 | Tanaka ................ G02B 6/4403 385/114 |
| 2015/0293325 A1 | 10/2015 | Kasahara et al. |
| 2017/0285287 A1 | 10/2017 | Murata et al. |
| 2019/0250347 A1 | 8/2019 | Fallahmohammadi et al. |
| 2020/0026012 A1 | 1/2020 | Murata et al. |
| 2020/0026013 A1 | 1/2020 | Murata et al. |

FOREIGN PATENT DOCUMENTS

| | | |
|---|---|---|
| JP | H07069686 A | 3/1995 |
| JP | 2011128377 A | 6/2011 |
| JP | 2012234122 A | 11/2012 |
| JP | 2013134477 A | 7/2013 |
| JP | 2015086087 A | 5/2015 |
| KR | 2014-0079824 A | 6/2014 |

OTHER PUBLICATIONS

International Telecommunication Union Telecommunication Standardization Sector of ITU (ITU-T), Series G: Transmission Systems and Media, Digital Systems and Networks, G.657, dated Nov. 2016 (24 pages).

International Electrotechnical Commission, Technical Report, "Optical fibres—Measurement methods—Microbending sensitivity," Edition 2.0, Dec. 2012 (28 pages).

Search Report Section of Office Action issued in corresponding Chinese Application No. 201780053298.4 dated May 18, 2020 (2 pages).

Wei Fang, "Optical Fiber Cable Technology and Preparation"; Wuhan: Huazhong University of Science and Technology Press; pp. 153; Mar. 2013 (2 pages).

\* cited by examiner

OPTICAL FIBER COLORED CORE WIRE, OPTICAL FIBER CABLE, AND METHOD OF MANUFACTURING OPTICAL FIBER COLORED CORE WIRE

CROSS-REFERENCE TO RELATED APPLICATIONS

This is a national phase application of International Patent Application No. PCT/JP2017/035146 filed on Sep. 28, 2017, which claims priority to Japanese Patent Application No. 2016-194549 filed on Sep. 30, 2016. The full contents of both applications are incorporated herein by reference.

TECHNICAL FIELD

The present invention relates to an optical fiber colored core wire, an optical fiber cable, and a method of manufacturing an optical fiber colored core wire.

BACKGROUND

Conventionally, an optical fiber colored core wire as disclosed in Patent Document 1 is known. The optical fiber colored core wire includes a bare optical fiber, a primary layer covering the bare optical fiber, a secondary layer covering the primary layer, and a colored layer disposed outside the secondary layer. By forming the primary layer of a soft material having a small Young's modulus, an external force applied to the bare optical fiber can be relieved, and an increase in transmission loss of light due to the external force can be suppressed. In addition, by forming the secondary layer disposed outside the primary layer of a hard material having a large Young's modulus, the bare optical fiber and the primary layer can be protected from an external force. Furthermore, the colored layer is colored in order to discriminate the optical fiber colored core wires from each other.

PATENT DOCUMENTS

[Patent Document 1] Japanese Unexamined Patent Application, First Publication No. 2013-134477

The above-described primary layer may be formed of a UV curable resin. In this case, when the UV curable resin to be the primary layer is cured by irradiation with UV light, reliability of the optical fiber colored core wire may be deteriorated due to insufficient curing.

SUMMARY

One or more embodiments of the present invention secure reliability of an optical fiber colored core wire in which a primary layer is formed of a UV curable resin.

An optical fiber colored core wire according to one or more embodiments of the present invention includes: the bare optical fiber; a primary layer formed of a UV curable resin covering the bare optical fiber; a secondary layer formed of a UV curable resin covering the primary layer; and a colored layer disposed outside the secondary layer and formed of a colored UV curable resin, in which the primary layer has a Young's modulus of 70% or more with respect to a saturated Young's modulus of the primary layer.

According to one or more embodiments of the present invention, it is possible to secure reliability of the optical fiber colored core wire in which the primary layer is formed of a UV curable resin.

DETAILED DESCRIPTION

Hereinafter, configurations of an optical fiber colored core wire and an optical fiber cable according to one or more embodiments will be described with reference to FIGS. 1 and 2. Note that in FIGS. 1 and 2, the scale is appropriately changed in order to make it possible to recognize the shape of each constituent member.

Figure 1:
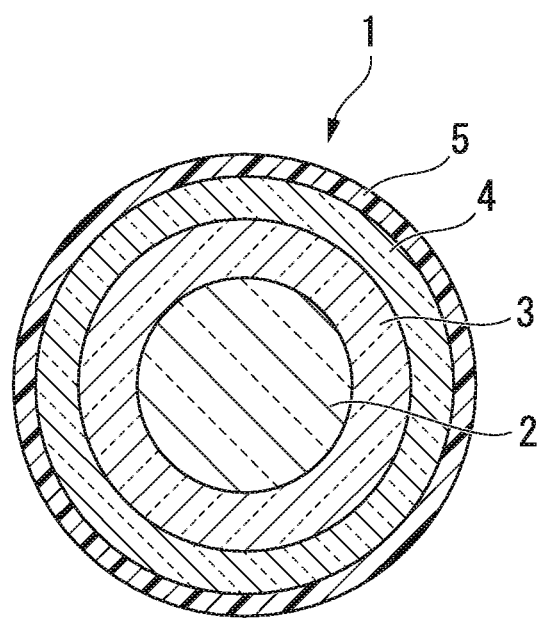
FIG. 1 is a cross-sectional view of an optical fiber colored core wire according to one or more embodiments.

FIG. 1 is a cross-sectional view of an optical fiber colored core wire according to one or more embodiments. As shown in FIG. 1, an optical fiber colored core wire 1 includes the bare optical fiber 2, a primary layer 3, a secondary layer 4, and a colored layer 5.

The bare optical fiber 2 is formed of, for example, quartz-based glass and transmits light. The bare optical fiber 2 has, for example, a mode field diameter (MFD) of 8.2 to 9.6 µm in light having a wavelength of 1310 nm. The primary layer 3 is formed of a UV curable resin and covers the bare optical fiber 2. The secondary layer 4 is formed of a UV curable resin and covers the primary layer 3. The colored layer 5 is formed of a colored UV curable resin and is disposed outside the primary layer 3 and the secondary layer 4.

Note that specific materials of the UV curable resins to be the primary layer 3, the secondary layer 4, and the colored layer 5 may be the same as or different from each other. Examples of the UV curable resins include an acrylate resin.

The optical fiber colored core wire 1 can be used, for example, as an intermittently fixed optical fiber tape. The intermittently fixed optical fiber tape is an optical fiber tape in which a plurality of the optical fiber colored core wires 1 is juxtaposed and the adjacent optical fiber colored core wires 1 are intermittently connected to each other with a plurality of connectors. The intermittently fixed optical fiber tape can be rolled in a width direction to form a tubular shape or folded. Therefore, by using the intermittently fixed optical fiber tape, the plurality of optical fiber colored wires 1 can be bundled at high density.

The optical fiber colored core wire 1 can be used for a loose tube cable, a slot type cable, a ribbon type center tube cable, a wrapping tube cable, a micro duct cable, and the like. The micro duct cable is a type of loose tube cable and is obtained by packing optical fibers at high density in a loose tube having a small diameter. Due to such a structure, relatively strong side pressure acts on the optical fiber colored core wire 1 in the loose tube cable, and transmission loss of light may increase due to microbending.

In order to suppress transmission loss of light when side pressure acts and to improve a microbending resistance characteristic, it is effective to form the secondary layer 4 or the colored layer 5 of a hard material and to form the primary layer 3 of a soft material. In this manner, by making the primary layer 3 in contact with the bare optical fiber 2 soft and making the secondary layer 4 or the colored layer 5 located outside the primary layer 3 hard, the bare optical fiber 2 can be effectively protected from an external force. In one or more embodiments, the secondary layer 4 or the colored layer 5 has a Young's modulus of 700 MPa or more and 1400 MPa or less, for example.

Figure 2:
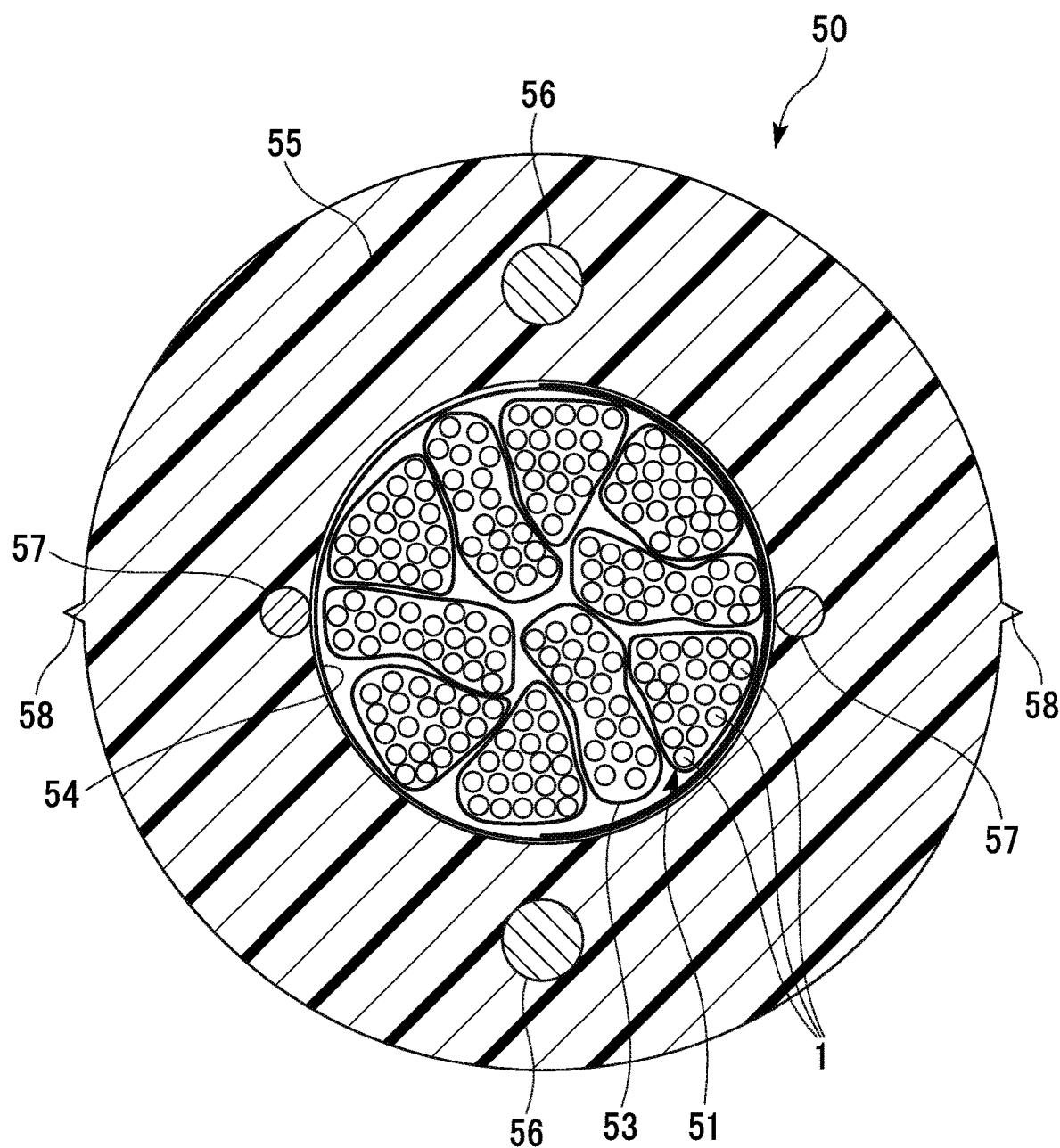
FIG. 2 is a cross-sectional view of an optical fiber cable according to one or more embodiments.

FIG. 2 is a diagram showing an example of an optical fiber cable 50 using the optical fiber colored core wire 1 according to one or more embodiments. The optical fiber cable 50 includes the plurality of optical fiber colored core wires 1, a binding material 53, a wrapping tube 54, a cylindrical sheath 55, a pair of tension-resisting members 56, and a pair of tear cords 57.

The binding material 53 bundles the plurality of optical fiber colored core wires 1. The wrapping tube 54 covers the optical fiber colored core wires 1 bundled by the binding material 53. The sheath 55 covers the optical fiber colored core wires 1 together with the wrapping tube 54. The pair of tension-resisting members 56 is buried in the sheath 55. The pair of tear cords 57 is buried in a position close to an inner peripheral surface in the sheath 55. A marker protrusion 58 protrudes from an outer peripheral surface of the sheath 55 at an outside of each of positions where the pair of tear cords 57 is disposed. The marker protrusion 58 is formed along the tear cord 57 and indicates a position in which the tear cord 57 is buried. Note that the optical fiber cable 50 does not need to include the wrapping tube 54, the tension-resisting member 56, the tear cord 57, or the marker protrusion 58.

Next, a process of manufacturing the optical fiber cable 50 will be described.

In order to manufacture the optical fiber cable 50, first, a bare wire forming step is performed. In the bare wire forming step, the bare optical fiber 2 is formed. The bare optical fiber 2 is drawn out from a glass base material heated to, for example, approximately 2000° C., and is formed to have a desired outer diameter. The outer diameter of the bare optical fiber 2 is, for example, approximately several hundred μm.

Next, a primary layer forming step is performed. In the primary layer forming step, a UV curable resin to be the primary layer 3 is applied around the bare optical fiber 2. Thereafter, the applied UV curable resin is irradiated with UV light to be cured to form the primary layer 3.

Next, a secondary layer forming step is performed. In the secondary layer forming step, a UV curable resin to be the secondary layer 4 is applied around the primary layer 3. Thereafter, the applied UV curable resin is irradiated with UV light to be cured to form the secondary layer 4. Note that by applying a UV curable resin to be the primary layer 3 around the bare optical fiber 2, subsequently applying a UV curable resin to be the secondary layer 4 onto the UV curable resin to be the primary layer 3, and irradiating the UV curable resins with UV light, the primary layer 3 and the secondary layer 4 may be cured collectively. That is, the primary layer forming step and the secondary layer forming step may be performed simultaneously.

Next, a colored layer forming step is performed. In the colored layer forming step, a UV curable resin to be the colored layer 5 is applied around the secondary layer 4. Thereafter, the applied UV curable resin is irradiated with UV light to be cured to form the colored layer 5. As a result, the optical fiber colored core wire 1 is obtained.

Next, the optical fiber colored core wire 1 is housed in the sheath 55 to obtain the optical fiber cable 50.

In this manner, in the process of manufacturing the optical fiber colored core wire 1, irradiation with UV light is performed a plurality of times. Here, the inventor of the present application has found that curing of the primary layer 3 may progress even in a step after the primary layer forming step. Specifically, in a case where curing of the primary layer 3 in the primary layer forming step is insufficient, when the primary layer 3 is irradiated with UV light in a subsequent step, the UV light which has passed through the secondary layer 4 and the colored layer 5 is absorbed by the primary layer 3, and curing of the primary layer 3 progresses.

When such a phenomenon occurs, the Young's modulus of the primary layer 3 may become harder than a desired range, an action of relaxing an external force by the primary layer 3 may become insufficient, and transmission loss of light may thereby increase. In addition, due to insufficient curing of the primary layer 3, when water comes into contact with the optical fiber colored core wire 1, the primary layer 3 may be peeled off from the bare optical fiber 2, or water bubbles may be interposed between the primary layer 3 and the bare optical fiber 2 to cause side pressure to act on the bare optical fiber 2.

Focusing on the above conditions, transmission loss of light, reliability, and the like of the optical fiber cable 50 have been verified, and a result thereof will be described with reference to Table 1. Note that each of examples shown in Table 1 uses the optical fiber colored core wire 1 having MFD of 9.1 μm for light having a wavelength of 1310 nm, an outer diameter of the bare optical fiber 2 of 125 μm, an outer diameter of the primary layer 3 of 190 μm, an outer diameter of the secondary layer 4 of 239 μm, and an outer diameter of the colored layer 5 of 252 μm. This optical fiber colored core wire 1 conforms to G652D or G657A1 defined by, for example, the International Telecommunication Union Telecommunication Standardization Sector (ITU-T). Note that the outer diameters of the primary layer 3, the secondary layer 4, and the colored layer 5 are design values, and the actual dimensions thereof have an error of approximately ±3 μm. In addition, the dimensions and the like are mere examples, and the results obtained from the examples shown in Table 1 can also be applied to the optical fiber colored core wire 1 in which the dimensions and MDF are changed from the above values.

TABLE 1

|  | Example 1 | Example 2 | Example 3 | Example 4 | Example 5 | Example 6 |
| --- | --- | --- | --- | --- | --- | --- |
| Primary Young's modulus before coloring [MPa] | 0.50/71% | 0.30/60% | 0.65/74% | 0.16/67% | 0.63/88% | 0.42/68% |
| Primary Young's modulus after coloring [MPa] | 0.60/86% | 0.36/71% | 0.68/77% | 0.17/70% | 0.72/97% | 0.50/81% |
| Saturated primary Young's modulus [MPa] | 0.70 | 0.50 | 0.88 | 0.24 | 0.74 | 0.62 |
| Microbending characteristic before coloring [dB/km] | 0.14 | 0.06 | 0.19 | 0.02 | 0.17 | 0.11 |
| Microbending characteristic in colored state [dB/km] | 0.15 | 0.07 | 0.19 | 0.03 | 0.18 | 0.13 |

TABLE 1-continued

|  |  |  |  |  |  |  |
|---|---|---|---|---|---|---|
| Cable characteristic | OK | OK | OK | OK | OK | OK |
| Warm water immersion test (60° C.) of ribbon | OK | OK | OK | OK | OK | OK |

|  | Comparative Example 1 | Comparative Example 2 | Comparative Example 3 | Comparative Example 4 | Comparative Example 5 |
|---|---|---|---|---|---|
| Primary Young's modulus before coloring [MPa] | 0.62/76% | 0.70/64% | 0.53/63% | 0.27/45% | 0.12/50% |
| Primary Young's modulus after coloring [MPa] | 0.74/90% | 0.88/80% | 0.56/68% | 0.37/62% | 0.15/63% |
| Saturated primary Young's modulus [MPa] | 0.82 | 1.10 | 0.83 | 0.60 | 0.24 |
| Microbending characteristic before coloring [dB/km] | 0.16 | 0.21 | 0.17 | 0.04 | 0.02 |
| Microbending characteristic in colored state [dB/km] | 0.19 | 0.32 | 0.18 | 0.07 | 0.02 |
| Cable characteristic | NG | NG | OK | OK | NG |
| Warm water immersion test (60° C.) of ribbon | OK | OK | NG | NG | NG |

(Definition)

The "primary Young's modulus" in Table 1 indicates a Young's modulus of the primary layer 3 in each state during a process of manufacturing the optical fiber cable 50. For example, the "primary Young's modulus before coloring" indicates the Young's modulus of the primary layer 3 after the secondary layer forming step. The "primary Young's modulus after coloring" indicates the Young's modulus of the primary 1700 layer 3 after the colored layer forming step.

The Young's modulus of the primary layer 3 is determined by applying shear stress to the primary layer 3 in a state where the bare optical fiber 2 is fixed, measuring a strain, and drawing a stress-strain curve.

For example, focusing on the primary Young's modulus of Example 1, the primary Young's modulus is 0.50 MPa before coloring, and 0.60 MPa after coloring. The rise in the Young's modulus of the primary layer 3 as the process progresses in this manner means that curing of the primary layer 3 progresses by UV light which has passed through the secondary layer 4 and the colored layer 5. This tendency is common to Examples 1 to 6 and Comparative Examples 1 to 5.

Note that Table 1 shows the degree of curing together with each numerical value of primary Young's modulus. The degree of curing is a ratio of the primary Young's modulus to a numerical value of saturated primary Young's modulus described later. For example, in Example 1, the primary Young's modulus before coloring is 0.50 MPa, and the saturated primary Young's modulus is 0.70 MPa. At this time, the degree of curing before coloring in Example 1 can be calculated as 0.50±0.70 0.71 (71%). Therefore, in the column of "primary Young's modulus before coloring" in Example 1, a numerical value of 71% meaning the degree of curing is also written together with the numerical value of 0.50 MPa.

The "saturated primary Young's modulus" in Table 1 indicates the saturated Young's modulus of the primary layer 3. More specifically, the "saturated primary Young's modulus" in Table 1 indicates the Young's modulus of the primary layer 3 in a case of performing irradiation with UV light including a wavelength contributing to a curing reaction in an amount sufficient for completely curing the primary layer 3 in a state where a UV curable resin to be the primary layer 3 is applied to the bare optical fiber 2. For example, in the present Example, when a UV curable resin to be the primary layer 3 was irradiated with UV light having a center wavelength of approximately 365 nm at 1 J/cm$^2$, even if the curable resin was further irradiated with UV light, the Young's modulus of the primary layer 3 did not rise. This state is defined as a state in which the primary layer 3 has been completely cured. In addition, the above "degree of curing" is calculated based on this saturated Young's modulus, and therefore is an index indicating how much the primary layer 3 is cured in each state.

The "microbending characteristic" in Table 1 indicates stability of light transmission of the optical fiber colored core wire 1 against side pressure. Specifically, the "microbending characteristic" indicates a value obtained by measuring the magnitude of transmission loss of light passing through the bare optical fiber 2 under conditions that a tension is 1 N, a sandpaper is #360, a length is 600 m, and a bobbin size is φ400 mm in IEC-TR622221 Method-B.

The "cable characteristic" in Table 1 indicates a result obtained by measuring the magnitude of transmission loss of light when an optical fiber cable is manufactured using the optical fiber colored core wire 1. Specifically, in a micro duct cable including the 288 optical fiber colored core wires 1, when the ambient temperature is changed in a range of −50° C. to +85° C., a case where transmission loss of light having a wavelength of 1550 nm is 0.05 dB/km or less is evaluated to be OK (good), and a case where the transmission loss is larger than 0.05 dB/km is evaluated to be NG (poor).

Incidentally, in a case where a numerical value of the above microbending characteristic is large, the transmission loss of light tends to increase by applying side pressure to the optical fiber colored core wire 1. Therefore, the cable characteristic is also likely to be deteriorated. For example, in Comparative Example 2, a numerical value of "microbending characteristic in a colored state" is 0.32 dB/km, which is the largest in Table 1, and a test result of the "cable characteristic" is also poor.

The "warm water immersion test (60° C.) of ribbon" in Table 1 indicates stability of the ribbonized optical fiber colored core wire 1 against water. Specifically, a ribbon obtained by connecting the twelve optical fiber colored core wires 1 to each other was immersed in warm water at 60° C. for one month. While the ribbon is immersed in warm water or after the ribbon is taken out from warm water, a case where transmission loss of light having a wavelength of 1550 nm is 0.05 dB/km or less is evaluated to be OK (good), and a case where the transmission loss is larger than 0.05 dB/km is evaluated to be NG (poor).

(Primary Young's Modulus after Coloring)

Next, an optimal numerical range of the primary Young's modulus after coloring will be considered.

In a case where the primary Young's modulus after coloring is high, relaxation of an external force applied to the bare optical fiber 2 is insufficient when the external force is applied to the optical fiber colored core wire 1 in a form of a cable, and transmission loss of light increases. In addition, also in a case where the primary Young's modulus after coloring is excessively low, the primary layer 3 to which an external force has been applied is largely deformed, relaxation of the external force applied to the bare optical fiber 2 is thereby insufficient, and transmission loss of light increases. Therefore, the optimum numerical range of the primary Young's modulus after coloring can be judged from a test result of the cable characteristic.

First, in Table 1, attention is focused on Example 5 and Comparative Example 1 in which the values of the primary Young's modulus after coloring are relatively large. In Example 5 in which the primary Young's modulus after coloring is 0.72 MPa, the test result of the cable characteristic is good. On the other hand, in Comparative Example 1 in which the primary Young's modulus after coloring is 0.74 MPa, which is the second largest after the value in Example 5, the test result of the cable characteristic is poor. From this result, in one or more embodiments, the primary Young's modulus after coloring is 0.72 MPa or less.

Next, in Table 1, attention is focused on Example 4 and Comparative Example 5 in which the values of the primary Young's modulus after coloring are relatively small. In Example 4 in which the primary Young's modulus after coloring is 0.17 MPa, the test result of the cable characteristic is good. On the other hand, in Comparative Example 5 in which the primary Young's modulus after coloring is 0.15 MPa, which is the second largest after the value in Example 4, the test result of the cable characteristic is poor. From this result, in one or more embodiments, the primary Young's modulus after coloring is 0.17 MPa or more.

From the above consideration, in one or more embodiments, the primary Young's modulus after coloring is 0.17 MPa or more and 0.72 MPa or less.

(Ratio of Primary Young's Modulus after Coloring to Saturated Primary Young's Modulus)

Next, an optimum numerical range of a ratio of the primary Young's modulus after coloring to the saturated primary Young's modulus (hereinafter simply referred to as "the degree of curing after coloring") will be considered.

In a case where the degree of curing after coloring is low, when a warm water immersion test (60° C.) of ribbon is performed, the primary layer 3 is eluted into water in contact with the optical fiber colored core wire 1, and transmission loss of light increases. Therefore, the optimum numerical range of the degree of curing after coloring can be judged from a result of the warm water immersion test (60° C.) of ribbon.

In Table 1, attention is focused on Example 4 and Comparative Example 3 in which the values of the degree of curing after coloring are relatively small.

In Example 4 in which the degree of curing after coloring is 70%, the result of the warm water immersion test (60° C.) of ribbon is good. On the other hand, in Comparative Example 3 in which the degree of curing after coloring is 68%, which is the second smallest after the value in Example 4, the result of the warm water immersion test (60° C.) of ribbon is poor. From this result, in one or more embodiments, the degree of curing after coloring is 70% or more.

Note that the maximum value of the degree of curing after coloring in Table 1 is 97% in Example 5. In a case where the degree of curing after coloring is larger than 97%, it is considered that elution of the primary layer 3 can be suppressed more reliably. Therefore, the degree of curing after coloring may be larger than 97%.

(Saturated Primary Young's Modulus)

Next, an optimal numerical range of the saturated primary Young's modulus will be considered.

Focusing on Comparative Example 2 in Table 1, the degree of curing after coloring is 80%, which is relatively large, but the cable characteristic is poor. It is considered that this is because the saturated primary Young's modulus is 1.10 MPa, which is relatively large, and a hard material is used as the primary layer 3.

Here, in Table 1, the saturated primary Young's modulus in Example 3 is 0.88 MPa, which is the second largest after the value in Comparative Example 2, and the cable characteristic of Example 3 is good.

From this result, in one or more embodiments, the saturated Young's modulus of the primary layer 3 is 0.88 MPa or less.

As described above, in one or more embodiments, the Young's modulus of the primary layer 3 in a state where the colored layer 5 has been formed into the optical fiber colored core wire 1 is 70% or more with respect to the saturated Young's modulus of the primary layer 3. This makes the degree of curing of the primary layer 3 in a state of the optical fiber colored core wire 1 reach a sufficient degree to satisfy the characteristics of the optical fiber colored core wire 1. This makes it possible to suppress elution of the primary layer 3 when the optical fiber colored core wire 1 comes into contact with water. Therefore, it is possible to suppress an increase in transmission loss of light generated by contact of the optical fiber colored core wire 1 with water to secure reliability.

In a case where the primary layer 3 is formed of a material having a saturated Young's modulus of 0.88 MPa or less, even if the primary layer 3 is further cured after the primary layer forming step, the primary layer 3 has sufficient softness to satisfy the characteristics of the optical fiber colored core wire 1. Therefore, it is possible to relax an external force transmitted to the bare optical fiber 2 to secure a microbending resistance characteristic.

By setting the Young's modulus of the primary layer 3 in a form of the optical fiber colored core wire 1 to 0.72 MPa or less, it is possible to suppress transmission loss of light generated when side pressure is applied to the optical fiber colored core wire 1 and to secure a microbending resistance characteristic. By setting the Young's modulus to 0.17 MPa or more, it is possible to suppress insufficient relaxation of an external force applied to the bare optical fiber 2 due to excessive softness of the primary layer 3.

By setting the Young's modulus of the secondary layer 4 or the colored layer 5 to 700 MPa or more and 1400 MPa or less, it is possible to protect the primary layer 3 and the bare optical fiber 2 from an external force, an impact, and the like.

In one or more embodiments, the optical fiber cable 50 is manufactured using the optical fiber colored core wire 1 in which the degree of curing of the primary layer 3 after coloring is 70% or more. As a result, for example, even when water infiltrates into the sheath 55, peeling of the primary layer 3 from the bare optical fiber 2 can be suppressed, and reliability of the optical fiber cable 50 can be secured.

Note that the technical scope of the present invention is not limited to the embodiments described above, and various modifications can be made without departing from the gist of the present invention.

For example, the optical fiber colored core wire 1 including the secondary layer 4 and the colored layer 5 has been described in the above embodiments. However, by causing the colored layer 5 to function also as the secondary layer 4, the primary layer 3 and the colored layer 5 may be adjacent to each other. In this case, the primary Young's modulus before coloring refers to the Young's modulus of the primary layer 3 after the primary layer forming step.

Besides, it is possible to appropriately replace the constituent elements in the above embodiments with well-known constituent elements, and the above embodiments and modifications may be appropriately combined without departing from the gist of the present invention. Accordingly, the scope of the invention should be limited only by the attached claims.

DESCRIPTION OF REFERENCE NUMERALS

1 Optical fiber colored core wire
2 Bare optical fiber
3 Primary layer
4 Secondary layer
5 Colored layer
50 Optical fiber cable
54 Wrapping tube
55 Sheath
56 Tension-resisting member

The invention claimed is:

1. An optical fiber colored core wire comprising:
a bare optical fiber;
a primary layer that comprises a UV curable resin that covers the bare optical fiber;
a secondary layer that comprises a UV curable resin that covers the primary layer; and
a colored layer disposed outside the secondary layer and that comprises a colored UV curable resin, wherein
the primary layer has a Young's modulus that is greater than or equal to 70% and less than or equal to 97% of a saturated Young's modulus of the primary layer.

2. The optical fiber colored core wire according to claim 1, wherein the saturated Young's modulus of the primary layer is less than or equal to 0.88 MPa.

3. The optical fiber colored core wire according to claim 1, wherein the Young's modulus of the primary layer is greater than or equal to 0.17 MPa and less than or equal to 0.72 MPa.

4. The optical fiber colored core wire according to claim 1, wherein the colored layer has a Young's modulus that is greater than or equal to 700 MPa and less than or equal to 1400 MPa.

5. The optical fiber colored core wire according to claim 1, wherein the secondary layer has a Young's modulus that is greater than or equal to 700 MPa and less than or equal to 1400 MPa.

6. An optical fiber cable comprising:
the optical fiber colored core wire according to claim 1; and
a sheath that houses the optical fiber colored core wire.

7. A method of manufacturing an optical fiber colored core wire, comprising:
forming a bare optical fiber;
forming a primary layer by applying a UV curable resin around the bare optical fiber and irradiating the UV curable resin with UV light; and
forming a colored layer by applying a UV curable resin around the primary layer and irradiating the UV curable resin with UV light, wherein
the primary layer, after forming of the colored layer, has a Young's modulus that is greater than or equal to 70% and less than or equal to 97% of a saturated Young's modulus of the primary layer.

8. An optical fiber colored core wire comprising:
a bare optical fiber;
a primary layer that comprises a UV curable resin that covers the bare optical fiber; and
a colored layer disposed outside the primary layer and that comprises a colored UV curable resin, wherein
the primary layer has a Young's modulus that is greater than or equal to 70% and less than or equal to 97% of a saturated Young's modulus of the primary layer.

* * * * *